(12) United States Patent
Moon

(10) Patent No.: US 6,811,276 B2
(45) Date of Patent: Nov. 2, 2004

(54) BACKLIGHT DEVICE

(75) Inventor: Jeong Min Moon, Kyonggi-Do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/329,818

(22) Filed: Dec. 27, 2002

(65) Prior Publication Data

US 2003/0189821 A1 Oct. 9, 2003

(30) Foreign Application Priority Data

Apr. 3, 2002 (KR) .............................. 10-2002-0018269

(51) Int. Cl.[7] ................................................ F21V 8/00
(52) U.S. Cl. ........................................ 362/31; 362/27
(58) Field of Search ............................. 362/26, 27, 31

(56) References Cited

U.S. PATENT DOCUMENTS 6,219,117 B1 * 4/2001 Nagakubo et al. ............ 349/65
6,390,638 B1 * 5/2002 Miller et al. .................. 362/31
6,435,685 B2 * 8/2002 Matsushita .................... 362/31
6,445,430 B1 * 9/2002 Sakamoto et al. ............ 349/62
6,502,945 B2 * 1/2003 Kim et al. ..................... 362/27
6,545,732 B2 * 4/2003 Nakano ......................... 349/58

FOREIGN PATENT DOCUMENTS

JP 6-174934 6/1994
KR 1997-28697 6/1997

* cited by examiner

*Primary Examiner*—Laura K. Tso
(74) *Attorney, Agent, or Firm*—Birch, Stewart, Kolasch & Birch, LLP

(57) ABSTRACT

A backlight device which includes a light-guiding plate having an upper face, a lower face and lateral sides, at least one light source provided at least at one lateral side for transferring light emanating from said light source to said upper face, and a fixing mechanism surrounding the light source and at least a portion of the light-guiding plate for reflecting the light toward the light-guiding plate.

22 Claims, 5 Drawing Sheets

BACKLIGHT DEVICE

This application claims the benefit of the Korean Application No. P2002-18269 filed on Apr. 3, 2002, which is hereby incorporated by reference.

BACKGROUND OF THE INVENTION

1. Field of the Invention

The present invention relates to a backlight device, and more particularly, to a backlight device in a liquid crystal display device.

2. Discussion of the Related Art

Generally, a CRT (cathode ray tube) as one of the display devices as widely used is mainly applied as a monitor for a TV, a measuring device, an information terminal, or the like. However, the weight and size of CRT devices fail to cope with the demand for compact and light electronic devices.

As substitutions for such CRT's, there can be mentioned a liquid crystal display (LCD) using the optical effect of an electrical field, a plasma display panel (PDP) using a gas electrical discharge, an electroluminescent display (ELD) using electroluminescence, and the like.

Thus, substantial effort has been made to study and develop the liquid crystal display device.

Lately, a flat liquid crystal display device having a display screen just several centimeters thick has been developed to be used as a monitor for space craft, for an airplane, as a notebook computer, a lap-top computer, a desk-top computer, a large-sized information display, or the like. Thus, demands for the liquid crystal display device continuously increase.

The liquid crystal display device is a light-receiving device displaying an image by controlling the quantity of light, thereby requiring an additional light source, i.e. a backlight device necessary for applying light to an LCD panel.

Backlight devices currently used include an EL (electroluminescent) backlight device, an LED backlight device, a CCFL (cold cathode fluorescent lamp) backlight device, and the like. The CCFL backlight device has less power consumption, provides a very bright white light, and has a small thickness. Hence, the CCFL backlight device is preferred to others.

The CCFL backlight device uses a direct or edge-light system and substantial effort has been made to study the edge-light system so as to cope with the demand for a thin and light-weighing display unit.

A backlight device for a monitor fabricated by a general edge-light system is explained as follows.

A backlight device for a general monitor, as shown in FIG. 1, includes a lamp 10 as a light sources emitting light, supported in frame 15, a light-guiding plate 11 guiding the light emitted from the lamp 10, a diffusion sheet 12 diffusing the light projected from the light-guiding plate 11 at a predetermined angle, a prism sheet 13 condensing the light diffusing from the diffusion sheet 12 so as to transfer the condensed light to an LCD panel unit 14, an LCD panel unit 14 on the prism sheet 13, a fixing mechanism (not shown in the drawing) under the light-guiding plate 11, and a reflection sheet 16 for reflecting the light transferred to the fixing mechanism on the LCD panel unit 14.

The backlight device further includes a lamp reflection sheet 18 disposed around the lamp 10 so as to reduce the loss of light projected from the lamp 10 and lamp holders 17 formed at both ends of the lamp 10 so as to fix the lamp 10 thereto as well as prevent contact between the light-guiding plate 11 and the lamp 10.

Two species of backlight devices according to the related art can be explained by referring to the attached drawings as follows.

A first backlight device according to related art, as shown in FIGS. 2A and 2B, includes a reflection sheet 23 beneath a light-guiding plate 21, a lamp reflection sheet 24 circumferential wrapping around the lamp 22, supported in lamp holder 26 and a fixing mechanism 25 which partially wraps around the lamp reflection sheet 24.

A second backlight device according to the related art, as shown in FIGS. 3A and 3B, includes a bottom reflection sheet 33 completely wrapping around the exterior of a lamp 32, supported a lamp holder 35 except for the light-incident face of a light-guiding plate 31 so as to carry out the function of a lamp reflection sheet. In this case, the fixing mechanism 34 is constituted so as to surround a lower portion and one side of the bottom reflection sheet 32.

The lamp reflection sheet 24 and the bottom reflection sheets 23 and 33 are made of materials having high reflectivity. In order to increase the reflective efficiency, metal is coated on the lamp reflection sheet 24 or a coating film is attached to the lamp reflection sheet 24. The bottom reflection sheets 23 and 33 are made of thin materials which bring about mirror reflection or diffusion reflection.

However, the structure of each of the backlight devices according to the related art becomes complicated due to the lamp reflection sheet 24 surrounding the lamp 32.

Moreover, when the bottom reflection sheet 33 extending for the function of a lamp reflection sheet is used, it is difficult to maintain the uniform shape to surround the lamp 32 since the bottom reflection sheet 33 is formed with a thin film.

SUMMARY OF THE INVENTION

The present invention is directed to a backlight device that substantially obviates one or more problems due to limitations and disadvantages of the related art.

Accordingly, an object of the present invention is to provide a backlight device which provided for light to be incident on a light-guiding plate without loss of the light generated from a lamp while at the same time simplifying the constitution of the backlight device.

Another object of the present invention is to provide a backlight device which stably fixes and protects the light-guiding plate and lamp.

Additional advantages, objects, and features of the invention will be set forth in part in the description which follows and in part will become apparent to those having ordinary skill in the art upon examination of the following or may be learned from the practice of the invention. The objectives and other advantages of the invention may be realized and attained by the structure particularly pointed out in the written description and claims hereof as well as the appended drawings.

To achieve these objects and other advantages and in accordance with the purpose of the present invention, as embodied and broadly described herein, the backlight device of the present invention includes at least one lamp, a light-guiding plate for laterally receiving light emitted from the lamp and transferring the received light to an upper face, and a fixing mechanism surrounding the lamp and light-guiding plate for reflecting the light of the lamp toward the light-guiding plate, the fixing mechanism having at least one protrusion formed at an inner surface thereof.

Advantageously, the fixing mechanism is made of a material having a reflective function. More preferably, the fixing mechanism is made of a plastic material, e.g., a polyester or acrylic material. Also, a sheet or a film can be attached to or coated on the inner surface of the fixing mechanism which advantageously surrounds the entire lower face and a portion of the upper face of the light-guiding plate.

A protrusion can be located between the lamp and light-guiding plate for separating the lamp and light-guiding plate from each other. The light-guiding plate has a corresponding recess to accommodate to the protrusion for separating the lamps from the light-guiding plate.

The protrusion corresponding to the recess can be an uneven shape.

The lamp can be arranged at one side of the light-guiding plate or at both sides of the light-guiding plate. Preferably, the backlight device further includes lamp holders provided at both ends of the lamp for fixing the lamp in a predetermined position.

In another aspect of the present invention, the backlight device includes at least one lamp, a light-guiding plate for receiving light emitted from the lamp through a lateral face and transferring the received light to an upper face, a reflection sheet placed under the light-guiding plate and extending around the lamp so as to reflect the light of the lamp toward the light-guiding plate, and a fixing mechanism surrounding the light-guiding plate and reflection sheet, the fixing mechanism having at least one protrusion formed at an inner surface thereof. Preferably, the protrusion is placed between the lamp and light-guiding plate and the reflection sheet has a recess corresponding to the protrusion.

Preferably, the reflection sheet has a thickness equal to or less than 1 mm and is made of a plastic material such as polyester.

The light-guiding plate can also be provided with a recess which defines an area where the lamp can be inserted. Correspondingly, the fixing mechanism contains a protrusion which extends into the recess. Advantageously, the lamp is arranged at one side of the light-guiding plate or at both sides of the light-guiding plate. The backlight device further can include lamp holders formed at both ends of the lamp for fixing the lamp in a predetermined position.

In the above-constituted backlight devices, according to the present invention, the protrusion or uneven protruding portion are formed on the fixing mechanism so as to fix the light-guiding plate thereto without additionally forming a lamp reflection sheet. The backlight devices according to the present invention, using the edge-light system, are applicable to a monitor backlight device having lamps arranged at both sides of the light-guiding plate and a notebook computer backlight device having a lamp arranged on only one side of the light-guiding plate.

It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like elements.

Figure 1:
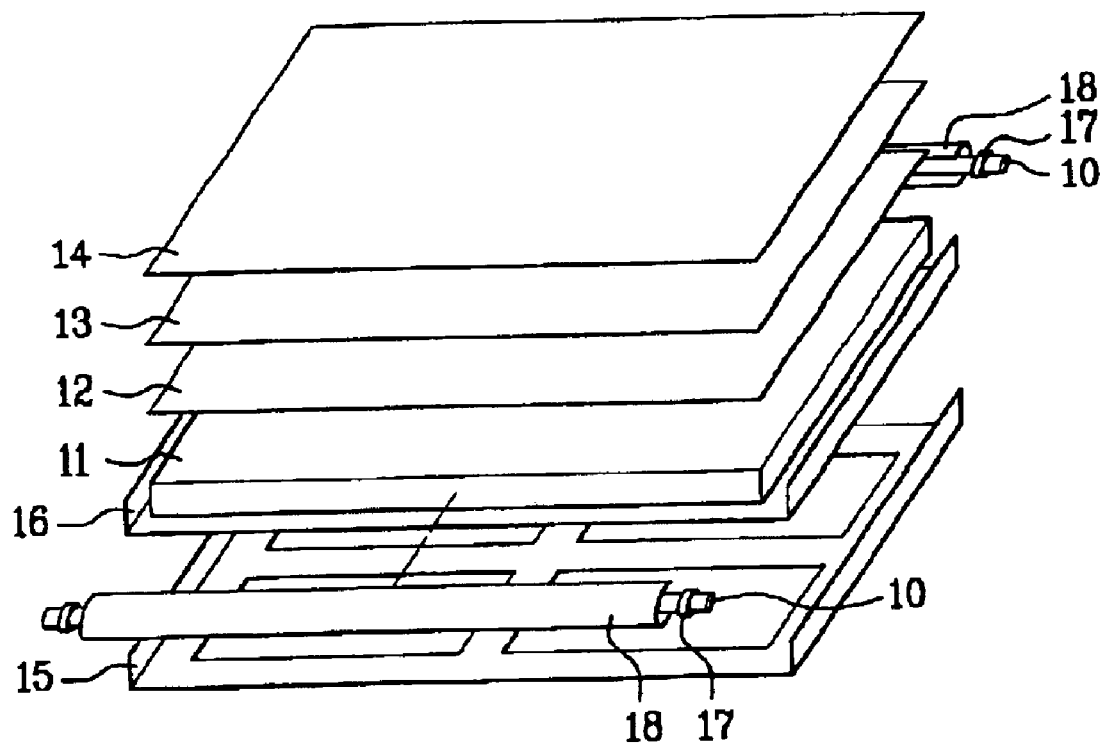
FIG. 1 illustrates an overall perspective view of a general monitor backlight device.
Figure 2A:
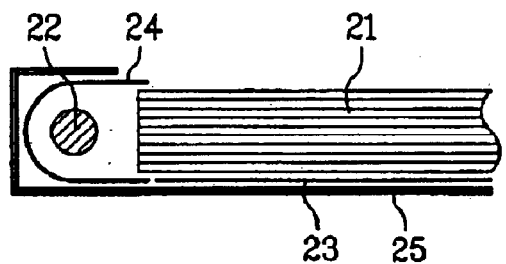
FIG. 2A illustrates a cross-sectional view of a backlight device according to the related art.
Figure 2B:
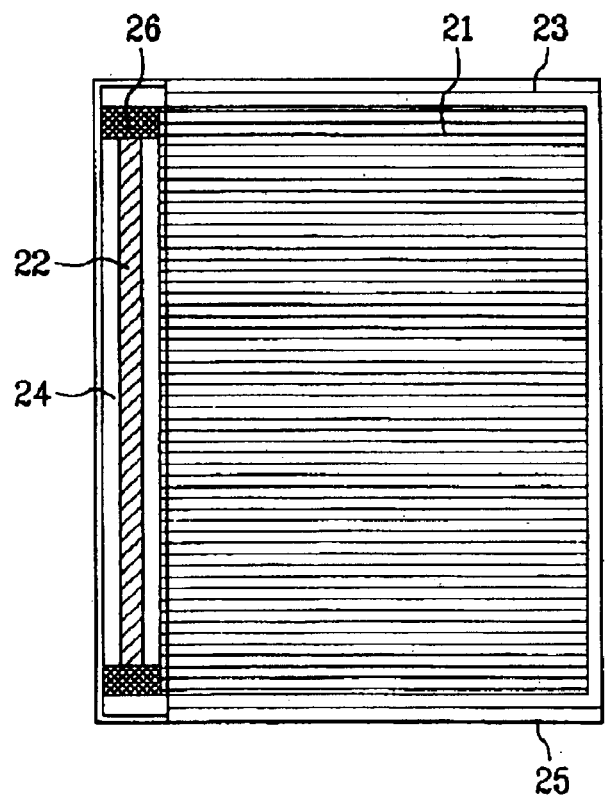
FIG. 2B illustrates a vertical layout of a backlight device according to the related art.
Figure 3A:
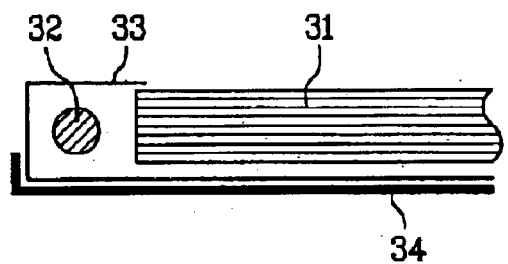
FIG. 3A illustrates a cross-sectional view of another backlight device according to the related art.
Figure 3B:
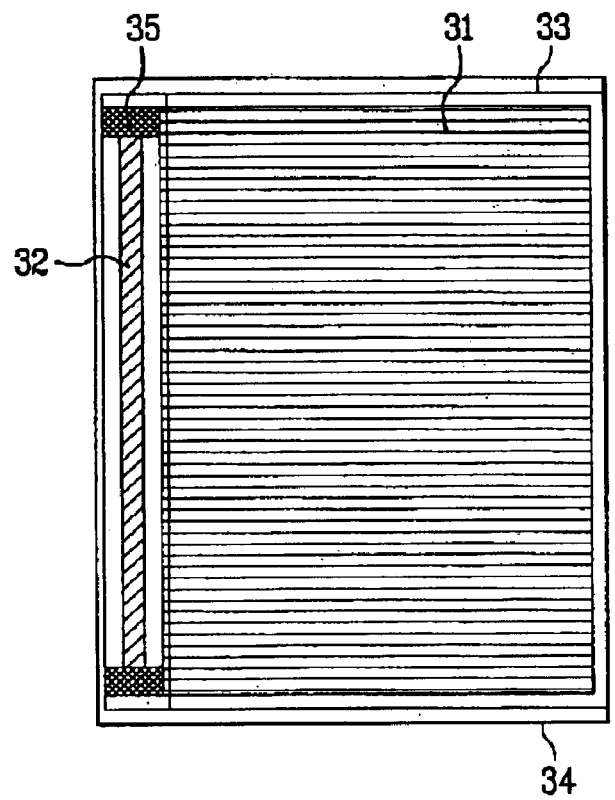
FIG. 3B illustrates another vertical layout of a backlight device according to the related art.

The backlight device according to the present invention includes a transformed a light-guiding plate, a reflection sheet and a fixing mechanism with the remaining constitution of the backlight device substantially corresponding to the general monitor backlight device as shown in FIG. 1.

Figure 4:
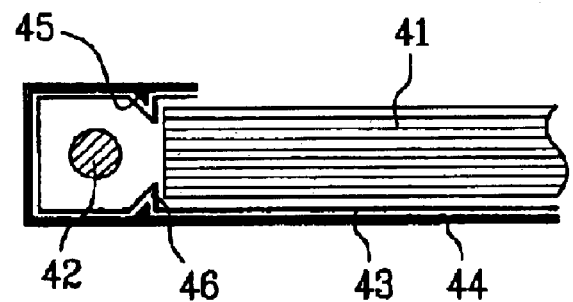
FIG. 4 illustrates a cross-sectional view of a backlight device according to a first embodiment of the present invention.

The backlight device according to a first embodiment of the present invention, as shown in FIG. 4, includes a lamp 42 which emits light as the light source, a light-guiding plate 41 which laterally receives the light emitted from the lamp 42 and transfers the laterally received light to an upper face, at least one diffusion sheet (not shown) for diffusing the light which is projected to an upper part of the light-guiding plate 41 at a predetermined angle, a prism sheet (not shown) for condensing the diffused light, an LCD panel unit (not shown) formed on the prism sheet, a reflection sheet 43 positioned under the light-guiding plate 41 and around the lamp 42 to reflect the light of the lamp 42 toward the light-guiding plate 41, and a fixing mechanism 44 located outside the reflection sheet 43 and having at least one protrusion 45 for fixing the reflection sheet 43 to the fixing mechanism 44 and prevent the light-guiding plate 41 and lamp 42 from contacting each other.

In this case, the lamp 42 can be arranged at one end of the light-guiding plate 41 or alternatively, the lamp 42 can be arranged at both ends of the light-guiding plate 41.

And, the reflection sheet 43 reflects the light dispersed under the light-guiding plate 41 toward the light-guiding plate 41 and also reflects the light of the lamp 42 toward the incident lateral face of the light-guiding plate 41.

The reflection sheet 43 has a recess corresponding to the protrusion 45. The recess 46 closely adheres to the protrusion 45, thereby stably fixing the reflection sheet 43 to the fixing mechanism without rocking. The protrusion 45 and recess 46 are located in a boundary area between the lamp 42 and light-guiding plate 41 so as to insure that the light-guiding plate 41 does not move toward the lamp 42. Thus, the protrusion 45 and recess 46 prevent contact and collision between the light-guiding plate 41 and lamp 42, thereby avoiding the possible breakage of the lamp 42.

The backlight device according to the first embodiment of the present invention includes the reflection sheet 43 which circumferentially extends around the lamp 42 to perform both functions of a lamp reflection sheet and bottom reflection sheet, and the fixing mechanism 44 is formed to surround the extended reflection sheet 43.

Protrusions 45 are formed at top and bottom from the inside of the fixing mechanism 44 for fixing the reflection sheet 43 to the fixing mechanism 44 and for separating the light-guiding plate 41 from the lamp 42.

Figure 5:
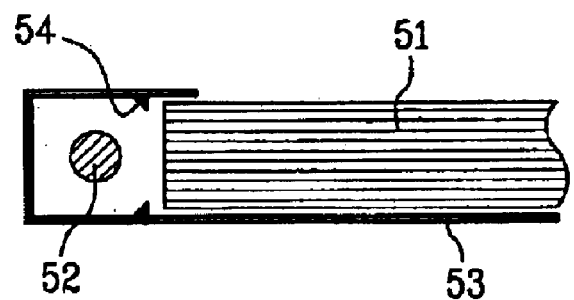
FIG. 5 illustrates a cross-sectional view of a backlight device according to a second embodiment of the present invention.

The backlight device according to a second embodiment of the present invention, as shown in FIG. 5, includes a lamp 52 emitting light as the light source, a light-guiding plate 51 for laterally receiving the light emitted from the lamp 52 and transferring the laterally received light to an upper face, and a fixing mechanism 53 located under the light-guiding plate 51 and extending around the lamp 52 to reflect the light from the lamp 52 toward the light-guiding plate 51.

In this case, the fixing mechanism 53 reflects the light dispersed under the light-guiding plate 51 toward the light-guiding plate 51 as well as reflects the light of the lamp 52 toward an incident face of the light-guiding plate 51.

In order to make the fixing mechanism 53 have a reflective function, the fixing mechanism 53 is made of a reflective material. Alternatively, a reflective sheet or a film is attached to or coated on an inner surface of the fixing mechanism 53. The reflective material is selected from a plastic acrylic material having a high reflectivity.

Moreover, the fixing mechanism 53 includes at least one protrusion 54 for preventing contact between the light-guiding plate 51 and lamp 52. The fixing mechanism 53 is constructed to also surround the upper edge of the light-guiding plate 51.

The backlight device according to the second embodiment of the present invention enables the fixing mechanism to play the role of the reflection sheet, thereby eliminating an additional reflection sheet 43.

Figure 6:
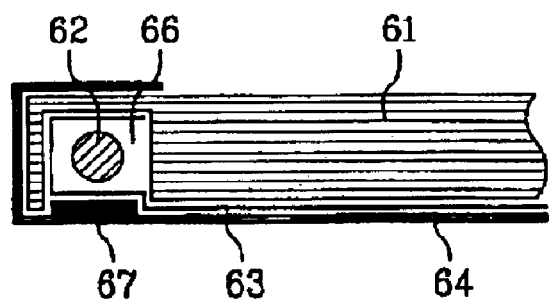
FIG. 6 illustrates a cross-sectional view of a backlight device according to a third embodiment of the present invention.

A backlight device according to a third embodiment of the present invention, as shown in FIG. 6, includes a lamp 62 for emitting light, a light-guiding plate 61 having a recess 66 for inserting a lamp 62 therein, a reflection sheet 63 located inside the recess 66 and under the light-guiding plate 61, and a fixing mechanism 64 having an extended portion 67 corresponding to the recess 66 for surrounding the lower face of the light-guiding plate 61 and a part of the upper face of the light-guiding plate 61.

In this case, the recess 66 is preferably formed at the lower face of the light-guiding plate 61, and the width and depth of the recess 66 should be greater than the diameter of the lamp 62 so that the light-guiding plate 61 and lamp 62 can be separated from each other at a predetermined distance.

The extended or protruding portion 67 of the fixing mechanism 64 protrudes (is inserted) inside the recess 66 so as to fix the light-guiding plate 61 thereto, and the difference between the widths of the uneven portion 67 and recess 66 should be small in order to fix the light-guiding plate 61 more stably.

The backlight device according to the third embodiment of the present invention fixes the positions of the lamp 62 and light-guiding plate 61 using the fixing mechanism 64 and has a simple structure since the reflection sheet 63 plays the role of the lamp reflection sheet.

Each of the reflection sheets 43 and 63 according to the first and third embodiments of the present invention is made of a non-metallic material such as a polyester having a thickness of less than 1 mm.

Figure 7:
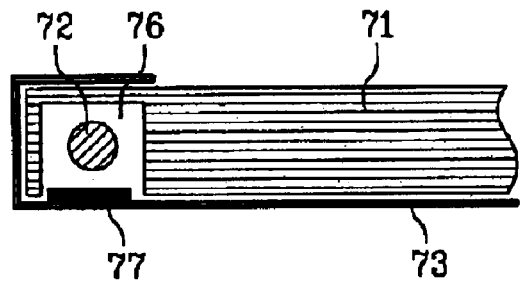
FIG. 7 illustrates a cross-sectional view of a backlight device according to a fourth embodiment of the present invention.

A backlight device according to a fourth embodiment of the present invention, as shown in FIG. 7, follows the constitution of the third embodiment of the present invention but does not include the reflection sheet 63. Thus, in the fourth embodiment of the present invention the fixing mechanism 73 also has a reflective function.

The backlight device according to the fourth embodiment of the present invention includes a lamp 72 for emitting light, a light-guiding plate 71 having a recess 76 for inserting the lamp 72 therein, and a fixing mechanism 73 having an extended or protruding portion 77 corresponding to the recess 76 and surrounding the lower face, the lateral face, and part of the upper face of the light-guiding plate 71.

In this case, the fixing mechanism 73 is made of a reflective material having a reflective function or a sheet or film attached to or coated on an inner surface of the fixing mechanism 73.

The light-guiding plates 61 and 71 according to the third and fourth embodiments of the present invention are formed to have the recesses formed in the light-guiding plates 61 and 71, respectively. Alternatively, a '|' or ']' shaped structure made of the same material as that of the light-guiding plate can be attached to the end of the light-guiding plate so as to form the recess.

Figure 8:
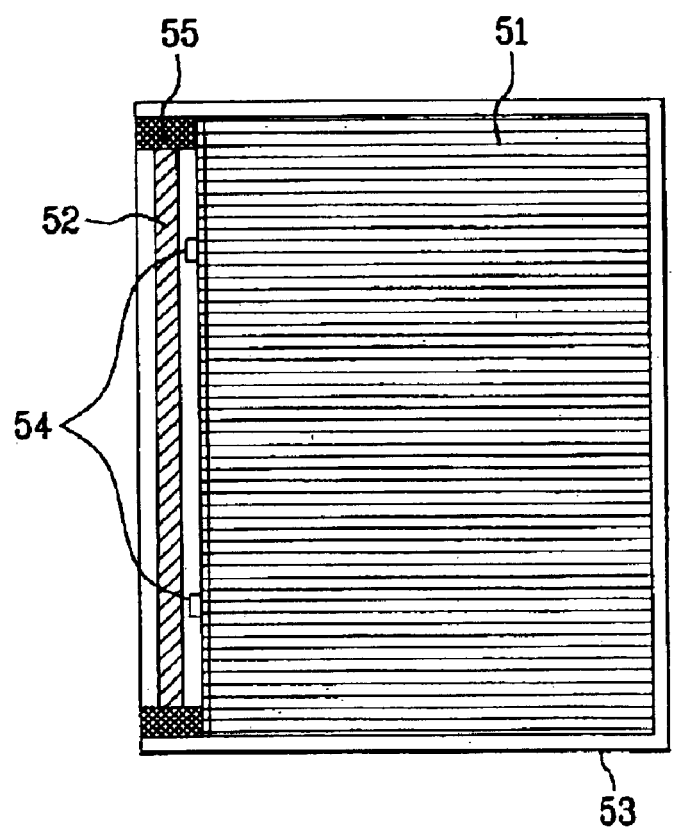
FIG. 8 illustrates a vertical layout of a backlight device according to the second embodiment of the present invention.

Additionally, each of the backlight devices according to the first and second embodiments of the present invention, as shown in FIG. 8, includes lamp holders 55 arranged at both ends of the lamp 52 to fix the lamp 52 in a predetermined position as well as prevent the light-guiding plate 51 from contacting the lamp 52.

As mentioned in the foregoing description, in order to prevent the rocking of the light-guiding plate 51 and its contact with the lamp 52, a plurality of protrusions 54 are formed on the fixing mechanism 53 at a predetermined interval from each other.

The backlight device of the present invention has the following advantages.

First of all, the lamp reflection sheet around the lamp is built in one body with the bottom reflection sheet provided under the light-guiding plate or the fixing mechanism is formed to have a reflective function instead of using the lamp and bottom reflection sheets, thereby simplifying the structure. Therefore, the present invention reduces product cost as well as providing an increased and improved yield.

Secondly, a protrusion or uneven portion is formed inside the fixing mechanism to fix the light-guiding plate thereto, thereby avoiding contact and collision with the lamp.

Finally, the fixing mechanism is extended to cover a part of the upper face of the light-guiding plate, thereby providing a backlight device having a stable structure.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A backlight device comprising:
    a light-guiding plate having an upper face, a lower face and lateral sides;
    at least one light source provided at least at one lateral side for transferring light emanating from said light source to said upper face; and
    a unified fixing mechanism surrounding the light source, the entire lower face and a portion of the upper face of the light-guiding plate for reflecting the light toward the light-guiding plate.

2. The backlight device of claim 1, wherein the fixing mechanism is made of a material having a reflective function.

3. The backlight device of claim 2, wherein the fixing mechanism is made of a plastic material.

4. The backlight device of claim 3, wherein the plastic material is an acrylic material.

5. The backlight device of claim 1, wherein a light reflective sheet or a film is attached to or coated on an inner surface of the fixing mechanism.

6. The backlight device of claim 1, wherein the light reflective sheet is a separate sheet which surrounds the entire lower face and a portion of the upper face of the light-guiding plate.

7. A backlight device comprising:
    a light-guiding plate having an upper face, a lower face and lateral sides;
    at least one light source provided at least at one lateral side for transferring light emanating from said light source to said upper face; and
    a fixing mechanism surrounding the light source, the entire lower face and a portion of the upper face of the light-guiding plate for reflecting the light toward the light-guiding plate, wherein a protrusion extends from an inner surface of the fixing mechanism, between the light source and the light-guiding plate, for separating the lamp and the light-guiding plate from each other.

8. A backlight device comprising:
    a light-guiding plate having an upper face, a lower face and lateral sides;
    at least one light source provided at least at one lateral side for transferring light emanating from said light source to said upper face; and
    a fixing mechanism surrounding the light source, the entire lower face and a portion of the upper face of the light-guiding plate for reflecting the light toward the light-guiding plate, wherein at least one lateral side of the light-guiding plate defines a recess which contains the light source, and the fixing mechanism contains a protruding portion which extends into said recess.

9. The backlight device of claim 1, wherein the light source is a lamp arranged at only one lateral side of the light-guiding plate or at both lateral sides of the light-guiding plate.

10. The backlight device of claim 9, further comprising lamp holders provided at both ends of the lamp to fix the lamp in a predetermined position.

11. The backlight device of claim 1, wherein the fixing mechanism surrounds the lower face, the lateral sides and at least a portion of the upper face of the light-guiding plate.

12. A backlight device comprising:
    a light-guiding plate having an upper face, a lower face and lateral sides;
    at least one light source provided at least at one lateral side for transferring light emanating from said light source to said upper face;
    a reflection sheet surrounding the light source and at least a portion of the light-guiding plate for reflecting the light toward the light-guiding plate; and
    a fixing mechanism surrounding the reflection sheet, the light source, the entire lower face and a portion of the upper face of the light-guiding plate for reflecting the light toward the light-guiding plate.

13. The backlight device of claim 12, wherein a protrusion extends for an inner surface of the fixing mechanism between the light source and the light-guiding plate for separating the lamp and the light-guiding plate from each other.

14. The backlight device of claim 13, wherein the reflection sheet has a recess which corresponds to the protrusion of the fixing mechanism.

15. The backlight device of claim 12, wherein the reflection sheet has a thickness equal to or less than 1 mm.

16. The backlight device of claim 12, wherein the reflection sheet is made of polyester material.

17. The backlight device of claim 12, wherein at least one lateral side of the light-guiding plate defines a recess which contains the light source, and the fixing mechanism contains a protruding portion which extends into said recess.

18. The backlight device of claim 12, wherein the lamp light source is a arranged at only one lateral side of the light-guiding plate or at both lateral sides of the light-guiding plate.

19. The backlight device of claim 12, further comprising lamp holders provided at both ends of the lamp to fix the lamp in a predetermined position.

20. The backlight device of claim 12, wherein the reflection sheet surrounds the lower face, the lateral sides and a portion of the upper face of the light-guiding plate.

21. A liquid crystal display device containing the backlight of claim 1.

22. A liquid crystal display device containing the backlight of claim 12.

* * * * *